Feb. 27, 1934.  A. Y. DODGE  1,949,042
MASS INERTIA TRANSMISSION
Filed July 20, 1932  2 Sheets-Sheet 1
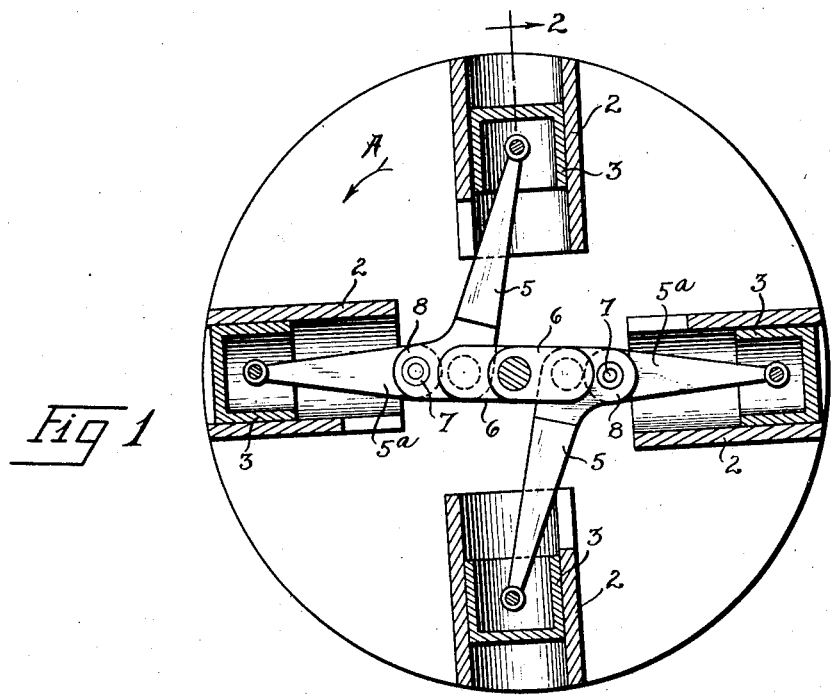
Fig 1
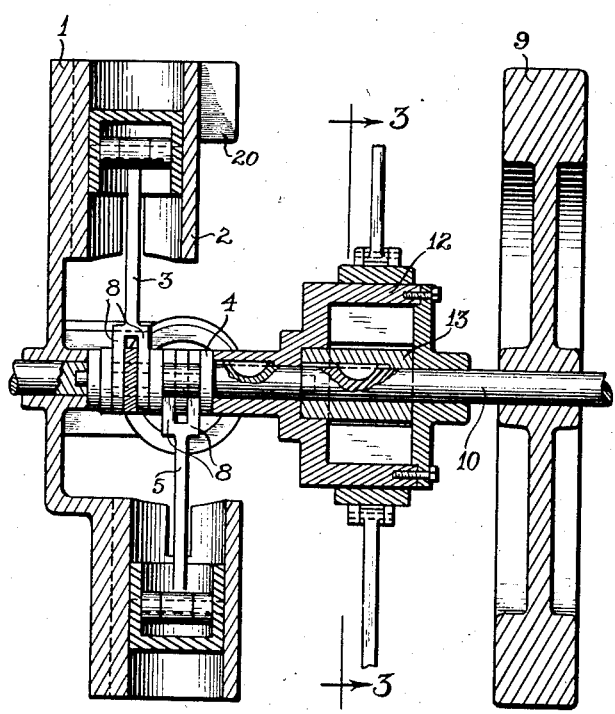
Fig 2
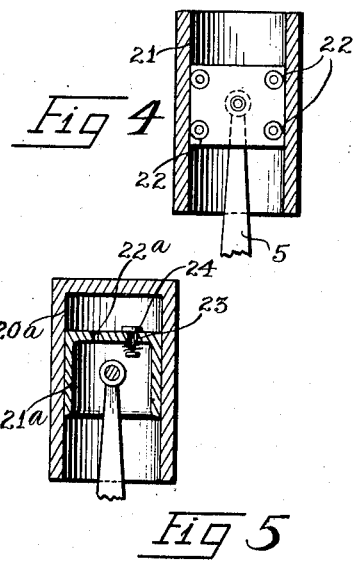
Fig 4
Fig 5
INVENTOR
Adiel Y. Dodge
Jones, Addington, Ames & Seibold
ATTYS Feb. 27, 1934.     A. Y. DODGE     1,949,042
MASS INERTIA TRANSMISSION
Filed July 20, 1932     2 Sheets-Sheet 2
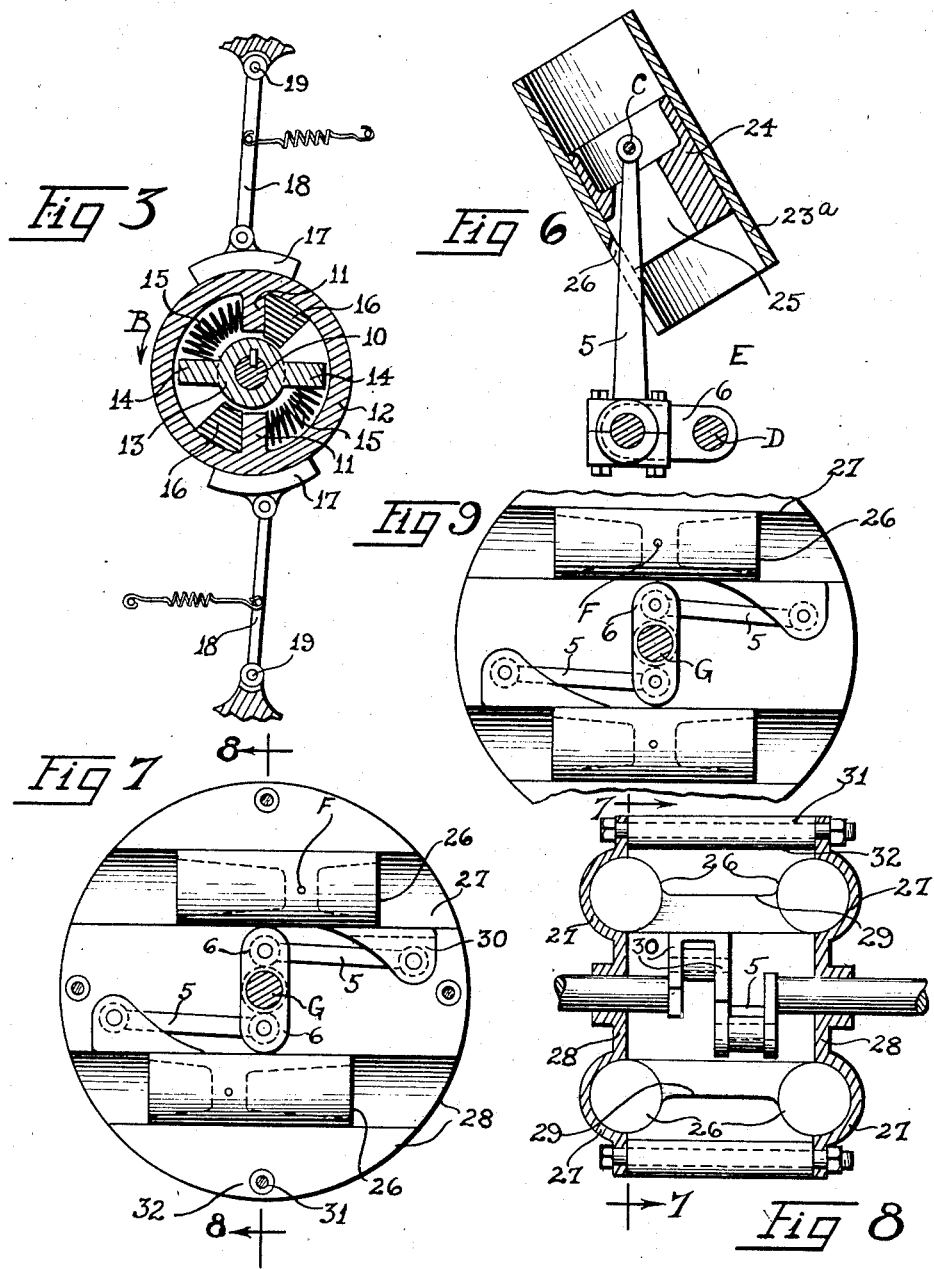
INVENTOR
Adiel Y Dodge
Jones, Addington, Ames & Seibold
ATTYS Patented Feb. 27, 1934

1,949,042

UNITED STATES PATENT OFFICE 1,949,042

MASS INERTIA TRANSMISSION

Adiel Y. Dodge, South Bend, Ind.

Application July 20, 1932. Serial No. 623,540

8 Claims. (Cl. 74—14)

My invention relates to mass inertia transmission.

One of the objects of my invention is to provide a transmission of this type which will be simple in construction and efficient and durable in operation.

A further object is to provide a mass inertia transmission in which the desired proportion of centrifugal force effect to mass inertia effect may be secured.

A further and important object of this invention is to provide an arrangement wherein the need for a ratchet or one-way clutch is elminated during most of the time.

Further objects will appear from the description and claims.

In a general way I accomplish the objects of my invention by providing a driving rotor and a driven rotor, one of which rotors has mounted thereon for rectilinear movement, mass inertia means having a connection with the other rotor, the desired effect of the centrifugal force and the mass inertia being increased by making the rectilinear movement non-radial.

In the drawings, in which several forms of my invention are shown:

Figure 1 is a transverse sectional view of a mass inertia transmission embodying my invention;

Fig. 2 is a section on the line 2—2 of Fig. 1;

Fig. 3 is a section on the line 3—3 of Fig. 2;

Fig. 4 is a sectional view showing a somewhat different form of plunger;

Fig. 5 is an axial sectional view showing still another form of plunger;

Fig. 6 is a sectional view showing a form of plunger set with its axis at an angle of about 15 degrees to the radial and having its center of gravity relatively through a pair of ears 8 extending laterally from the other connecting rod member;

Fig. 7 is a sectional view on the line 7—7 of Fig. 8, showing another form of my invention;

Fig. 8 is a section on the line 8—8 of Fig. 7; and

Fig. 9 is a transverse sectional view showing a different design of the construction of Figs. 7 and 8.

In action, assuming first that the cylinder carrying rotor 1 is the driving rotor, and that the direction of rotation is as indicated by the arrow A in Figure 1: It will be seen that so long as the driving rotor 1 is precessing with respect to the driven rotor 4, the plungers 3 will have an in and out movement within the cylinders 2.

For purposes of explanation it may be assumed that the crank shaft is stationary at the beginning of rotation of the driving rotor 1. Under these conditions, and considering the operation and action of the right-hand cylinder and plunger, as seen in Figure 1, during a complete rotation of the driving rotor with the driven rotor stationary, it is apparent that a centrifugal force will be acting upon the plungers at all times, and that this centrifugal force will cause a tension to exist in the connecting rods at all times. It is also apparent that during the first half revolution this tension in the connecting rod will tend to turn the crank shaft in the direction A, which is the same direction in which the driving member 1 is turning, but it is also apparent that over the next half revolution this tension in the connecting rod, due to centrifugal force, will have a tendency to turn the crank shaft in the opposite direction, if only centrifugal force is considered.

Now, giving consideration to the effect on the crank shaft, of accelerating and decelerating the mass, it is well known that this force alternates every quarter revolution, that is, during the first quarter revolution tension will be created in the connecting rod, due to accelerating the mass inwardly. Over the second quarter revolution, compression will be exerted in the connecting rod due to decelerating the mass, etc., if only linear acceleration is considered.

As a further elementary example, assuming that under the conditions when the driving member is turning 1000 R. P. M., and the driven member is turning 500 R. P. M., the mean effective force due to accelerating and decelerating the mass radially is equal to twice that due to centrifugal action, the following will take place: if only centrifugal force and accelerating forces are considered.

*First quarter revolution*

Tension is caused in the connecting rod due to centrifugal force, and tension in the connecting rod is caused due to accelerating mass towards center. The mean effective force due to centrifugal action may be designated as A and the mean effective force due to inertia will then equal 2—A. The results are plus 1—A due to centrifugal force, plus 2—A due to inertia force, equaling plus 3—A.

*Second quarter revolution*

Tension is caused in the connecting rod due to centrifugal force and compression in connecting rod due to decelerating mass. The results are plus 1—A due to centrifugal force, minus 2—A due to inertia force, equaling minus 1—A.

*Third quarter revolution*

Tension is caused in the connecting rod due to centrifugal force (but in wrong direction), and compression is caused in the connecting rod due to accelerating mass. The results are minus 1—A due to centrifugal force, plus 2—A due to inertia force, equaling plus 1—A.

*Fourth quarter revolution*

Tension is caused in the connecting rod due to centrifugal force (but in the wrong direction), and tension in connecting rod due to deceleration of mass (also in wrong direction). The results are minus 1—A due to centrifugal force, minus 2—A due to inertia force, equaling minus 3—A.

From the foregoing example it is apparent that forces in the reverse direction are equal to those in the forward direction, and that it becomes necessary to do something to increase the forces acting in a positive direction. I accomplish this by setting my cylinders or cross head slides for the weights at an angle other than radial. By means of this angle the decelerating and accelerating forces are modified to suit the conditions as follows:

I have another action to consider, namely the action of moving a mass which has a high speed through space from a point of high linear speed to a point of lower speed, i. e., nearer the center of rotation. This moving of the mass from the outer position to the more central position must of necessity retard the rate of flight of the mass through space. This requires force. That force causes tension in the connecting rod, and exists over the first and second quarter, causing a driving action in direction A.

During the third and fourth quarter the mass must be moved outward from a point of low speed (through space) to a point where it will have a higher speed through space, i. e., more remote from the center. This means that the mass must be accelerated (as to its speed through space). This requires a compressive force in the connecting rod, and causes a driving action in direction A on driven member.

It will be noted that the non-radial alignment of the cylinder tends to lessen the centrifugal force effect and to increase the mass inertia effect.

The force transmitted from the driving rotor to the driven rotor is in the nature of a series of impulses and the effect of these impulses is to cause the driven rotor to travel at a pulsating speed. In order to smooth out these pulsations between the driven rotor and the propeller shaft, I provide a resilient impulse converter between the driven fly wheel 9 and the propeller shaft 10. This resilient converter comprises a pair of inwardly extending vanes 11 or abutments extending inwardly from the drum portion 12, a collar 13 keyed to the driven shaft, and having outwardly extending radial vanes or abutments 14 thereon, and resilient means interposed between the abutments of the collar and the abutments on the drum. As illustrated, I have shown helical springs 15 interposed between the vanes 14 on the collar and the vanes 13 on the drum to yield to the impulse of the driven fly wheel 9 and on the opposite sides of the vanes I provide rubber blocks 16 interposed between the vanes on the collar and the vanes on the drum to yield to the recoil of the driving fly wheel 1. Should there be a recoil of large magnitude, other forms of yieldable devices might be employed to accomplish the same purpose. Because of this yieldable coupling or converter, the driven drum 12 may be accelerated under the impulses of the driving member 1 to a rotatable speed in excess of the average speed of the entire revolution. During the periods of time between impulses, this momentum will be transmitted from the fast moving driven drum 12 by the yielding connection to the driven shaft and during this period the yieldable members will have caused the driven drum 12 to slow down its rotative speed to a point below its average speed. These variations in speed will take place in such manner that the total average speed of the driven drum 12 will equal the total rotative speed of the driven shaft 10, but will fluctuate above and below the speed of the driven shaft and in so doing will continuously transmit torque through the impulse converter.

When the driven drum 12 is turning faster than the driven shaft 10 it will compress the yieldable members, storing force therein, which will be transmitted to the driven shaft and during this transmission the driven drum will be retarded until the yieldable material has again expanded. In place of the springs or rubber blocks it might be desirable to use air or other gaseous material as a cushioning medium.

While yieldable couplings have been used in the past for the purpose of smoothing out torque means, I do not know of a yieldable coupling being used for the purpose of allowing a momentum reservoir to store up energy in the form of velocity momentarily, and to absorb this momentum and distribute it to a driven member gradually while the momentum reservoir is emptying of its energy or velocity. I wish to point out that the second fly wheel 9 must act as a reservoir to absorb high torque impulses momentarily and distribute this torque over other parts of the revolution.

I have found it desirable to seek large forces caused by reciprocating the mass, and seek smaller forces due to centrifugal action. I accomplish this by keeping the weights close to the center of rotation.

In order to absorb the reverse impulses of the driven rotor, I provide a one-way clutch construction shown in Fig. 3, comprising a pair of friction clutch members 17 each pivotally mounted on a swinging link 18, which link is mounted on a fixed pivot at 19, the friction clutch member and link forming a sort of toggle arrangement, which will permit the driven rotor to rotate freely in the direction of the arrow B, but will prevent reverse rotation.

I find it desirable to provide the rotor 1 with a counterweight 20 to compensate for the offsetting of one pair of cylinders with respect to the other pair.

The construction shown in Fig. 4 is substantially the same as that in Figs. 1 to 3, inclusive, except that here the guide instead of being a circular cylinder may have opposed flat surfaces 21 on which anti-friction rollers 22 mounted on the plunger travel.

The construction shown in Fig. 5 may be substantially the same as that shown in Figs. 1 to 3, inclusive, except that here the end of the cylinder 20a is closed and the piston member 21a is provided with two restricted openings 22a and 23, for the passage of air, the restrictions to flow of air offering still further resistance to the radial movement of the plunger. In this form, the resistance to outward radial movement due to the air restrictions will be greater than the restrictions due to inward movement on account of the check valve 24 which closes the port 23 on the outward radial movement.

The construction shown in Fig. 6 is substantially like that just described except that here the cylinder 23—A and plunger 24 are mounted at a somewhat greater angle with respect to the radial line C—D (the angle D—C—E shown being about 15 degrees), and that the plunger 24 has its center of mass nearer the axis D of the crank shaft than its pivotal connection C between the connecting rod 5 and plunger. For this purpose the plunger has an opening 25 to provide clearance for the movement of the connecting rod and the cylinder itself is slotted at 26 for the same purpose.

The construction shown in Figs. 7 and 8 operates on the same general principles as the construction previously described, but here the reciprocating masses 26 are mounted to slide in semi-circular guides 27 formed in the opposite sides of the rotor discs 28, respectively, these guides 27 extending almost at right angles to the line F—G extending from the center of gravity F of the reciprocating mass to the axis G of the crank shaft when the reciprocating mass is in mid position. In the construction shown each reciprocating mass is in the form of two cylinders connected by a cross tie 29 from which extend a pair of ears 30 to which one end of the connecting rod 5 is pivotally secured. The other end of the connecting rod is secured to one of the oppositely extending cranks 6. The two guide members may be secured together by means of bolts 31 extending through spacer members 32, which spacer members extend between the two guide members.

The construction of Fig. 9 is substantially the same as that just described, except that here the guides 27 extend exactly at right angles to the line F—G extending from the center of gravity F of the mass to the axis G of the crank shaft, thereby reducing the centrifugal force effect to a minimum.

This application is a continuation as to the common subject matter of my co-pending application Serial No. 440,206, which was filed in the United States Patent Office on March 31, 1930.

While I have shown several embodiments of my invention, it is obvious that it might be embodied in other forms covered and defined by the appended claims.

1. A variable spaced transmission comprising a driving motor, a driven rotor, and mass inertia transmission between said driving rotor and said driven rotor comprising a mass rotatable with one of said rotors, means for guiding said mass for in and out rectilinear movement with respect to the axis of said rotor, the other rotor being provided with a crank and a link connecting said crank and mass, said rectilinear movement being non-radial.

2. A variable speed transmission comprising a driving rotor, a driven rotor, mass inertia means carried by one of said rotors, means for mounting said mass inertia means on said carrier rotor for rectilinear non-radial movement with respect thereto, and transmission means between said mass inertia means and that rotor which does not carry the mass inertia means.

3. A variable speed transmission comprising a driving rotor, a driven rotor, mass inertia means carried by one of said rotors, means for mounting said mass inertia means on said carrier rotor for rectilinear non-radial movement with respect thereto, and transmission means between said mass inertia means and that rotor which does not carry the mass inertia means, said carrier rotor being the driving rotor.

4. A variable speed transmission comprising a driving rotor, a driven rotor, mass inertia means carried by one of said rotors, means for mounting said mass inertia means on said carrier rotor for rectilinear non-radial movement with respect thereto, and transmission means between said mass inertia means and that rotor which does not carry the mass inertia means, said rectilinear movement being of such extent that when the mass inertia means is at its nearest position to the axis of the carrier rotor the radius through the center of the gravity of the mass will be substantially perpendicular to its rectilinear line of movement.

5. A variable speed transmission comprising a driving rotor, a driven rotor, mass inertia means carried by one of said rotors, means for mounting said mass inertia means on said carrier rotor for rectilinear non-radial movement with respect thereto, and transmission means between said mass inertia means and that rotor which does not carry the mass inertia means comprising a connecting rod pivotally connected with the mass inertia means and the non-carrier rotor.

6. A variable speed transmission comprising a driving rotor, a driven rotor, mass inertia means carried by one of said rotors, means for mounting said mass inertia means on said carrier rotor for rectilinear non-radial movement with respect thereto, and transmission means between said mass inertia means and that rotor which does not carry the mass inertia means comprising a connecting rod pivotally connected with the mass inertia means and the non-carrier rotor, the axis of the carrier rotor being farther from the pivotal connection with the mass inertia means than from the center of gravity of the mass inertia means.

7. A variable speed alternating impulse transmission comprising a driving rotor, a driven rotor, a mass movably mounted on one of said rotors to rotate therewith, means for guiding said mass on the rotor on which it is mounted for rectilinear non-radial movement, power transmission means connecting said mass with the other rotor, and one-way reactance means for said driven rotor for preventing reversely-acting impulses from causing reverse rotation of the driven rotor.

8. An alternating impulse device for a transmission comprising members reciprocated transversely of their radius of rotation, to give mass inertia impulses with the centrifugal effects substantially reduced, and having one-way clutch means to absorb the negative impulses.

ADIEL Y. DODGE.